(12) United States Patent
Anderson

(10) Patent No.: US 9,020,850 B1
(45) Date of Patent: *Apr. 28, 2015

(54) METHOD AND SYSTEM FOR IMPLEMENTING EFFECTIVE GOVERNANCE OF TRANSACTIONS BETWEEN TRADING PARTNERS

(71) Applicant: JPMorgan Chase Bank, N.A., New York, NY (US)

(72) Inventor: Milton M. Anderson, Fair Haven, NJ (US)

(73) Assignee: JPMorgan Chase Bank, N.A., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/657,205

(22) Filed: Oct. 22, 2012

Related U.S. Application Data

(63) Continuation of application No. 11/551,966, filed on Oct. 23, 2006, now Pat. No. 8,301,529.

(60) Provisional application No. 60/732,155, filed on Nov. 2, 2005.

(51) Int. Cl.
*G06Q 40/00* (2012.01)
*G06Q 30/06* (2012.01)
*G06Q 30/02* (2012.01)

(52) U.S. Cl.
CPC ............ *G06Q 30/06* (2013.01); *G06Q 30/0201* (2013.01); *G06Q 40/00* (2013.01)

(58) Field of Classification Search
CPC .......... G06Q 40/00; G06Q 99/00; H04L 9/32; G06F 17/60; G06F 7/00; G06F 13/00
USPC .......... 705/10, 39, 40, 54, 80; 707/1; 709/223
See application file for complete search history.

(56) References Cited

U.S. PATENT DOCUMENTS 3,653,480 A  4/1972  Yamamoto et al.
4,050,375 A  9/1977  Orleans (Continued)

FOREIGN PATENT DOCUMENTS

EP  0099999  7/1983
EP  421808  4/1991

(Continued)

OTHER PUBLICATIONS

Federal Circuit Decision in *CLS Bank et al.* vs. *Alice Corp.*, May 10, 2013. (Examiner notes that this decision is easily accessible by all patent/intellectual property law firms).*

(Continued)

*Primary Examiner* — James Trammell
*Assistant Examiner* — Sanjeev Malhotra
(74) *Attorney, Agent, or Firm* — Hunton & Williams LLP

(57) ABSTRACT

An embodiment of the present invention is directed to receiving a first independent log from a first trading partner wherein the first independent log comprises at least one request log entry associated with a transaction wherein the request log entry comprises at least a request identifier; receiving a second independent log from a second trading partner wherein the second independent log comprises at least one reply log entry associated with the transaction between the first trading partner and the second trading partner, wherein the reply log entry comprises at least a reply identifier; matching the at least one request log entry and the at least one reply log entry based on one or more of the request identifier and the reply identifier at a third party interface; identifying non-matching log entries at the third party interface; and forwarding the non-matching log entries.

32 Claims, 4 Drawing Sheets

(56) References Cited

U.S. PATENT DOCUMENTS

| | | |
|---|---|---|
| 4,141,078 A | 2/1979 | Bridges et al. |
| 4,205,780 A | 6/1980 | Burns |
| 4,264,808 A | 4/1981 | Owens et al. |
| 4,321,672 A | 3/1982 | Braun et al. |
| 4,396,985 A | 8/1983 | Ohara |
| RE31,692 E | 10/1984 | Tyburski et al. |
| 4,495,018 A | 1/1985 | Vohrer |
| 4,617,457 A | 10/1986 | Myers |
| 4,672,377 A | 6/1987 | Murphy |
| 4,694,397 A | 9/1987 | Grant et al. |
| 4,700,055 A | 10/1987 | Kashkashian, Jr. |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston |
| 4,823,264 A | 4/1989 | Deming |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,153 A | 3/1998 | Powell |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Belinger et al. |
| 5,873,072 A | 2/1999 | Kight |
| 5,878,141 A | 3/1999 | Daly et al. |
| 5,883,810 A | 3/1999 | Franklin et al. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |

(56) References Cited

U.S. PATENT DOCUMENTS

| | | |
|---|---|---|
| 5,903,881 A | 5/1999 | Schrader |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,125,391 A * | 9/2000 | Meltzer et al. ............ 709/223 |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,213,391 B1 | 4/2001 | Lewis |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,301,567 B1 | 10/2001 | Leong et al. |
| 6,304,858 B1 | 10/2001 | Mosler et al. |
| 6,321,212 B1 | 11/2001 | Lange |
| 6,324,524 B1 | 11/2001 | Lent et al. |
| 6,338,047 B1 | 1/2002 | Wallman |
| 6,338,049 B1 | 1/2002 | Walker et al. |
| 6,343,279 B1 | 1/2002 | Bissonette et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,490,568 B1 | 12/2002 | Omara et al. |
| 6,493,685 B1 | 12/2002 | Ensel et al. |
| 6,535,896 B2 | 3/2003 | Britton et al. |
| 6,536,663 B1 | 3/2003 | Lozier et al. |
| 6,554,185 B1 | 4/2003 | Montross et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| 6,820,058 B2 | 11/2004 | Wood et al. |
| 6,825,940 B1 | 11/2004 | Wu et al. |
| 6,860,375 B2 | 3/2005 | Hallowell et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,855 B2 | 11/2005 | Das et al. |
| RE38,957 E | 1/2006 | Laussermair et al. |
| 7,004,382 B2 | 2/2006 | Sandru |
| 7,062,456 B1 | 6/2006 | Riehl et al. |
| 7,068,832 B1 | 6/2006 | Price et al. |
| 7,104,443 B1 | 9/2006 | Paul et al. |
| 7,133,846 B1 * | 11/2006 | Ginter et al. ............ 705/54 |
| 7,177,836 B1 | 2/2007 | German et al. |
| 7,194,437 B1 | 3/2007 | Britto et al. |
| 7,200,255 B2 | 4/2007 | Jones et al. |
| 7,313,543 B1 | 12/2007 | Crane et al. |
| 7,317,823 B1 | 1/2008 | Price et al. |
| 7,337,148 B2 * | 2/2008 | Xie et al. ............ 705/80 |

(56) References Cited

U.S. PATENT DOCUMENTS

| | | | |
|---|---|---|---|
| 7,349,884 B1 | 3/2008 | Odom et al. | |
| 7,380,707 B1 | 6/2008 | Fredman | |
| 7,401,048 B2 | 7/2008 | Rosedale et al. | |
| 2001/0011222 A1 | 8/2001 | McLauchlin et al. | |
| 2001/0018666 A1 | 8/2001 | Sugiyama et al. | |
| 2001/0018739 A1 | 8/2001 | Anderson et al. | |
| 2001/0032139 A1 | 10/2001 | Debonnett, Jr. | |
| 2001/0037300 A1 | 11/2001 | Miyazaki et al. | |
| 2001/0037309 A1 | 11/2001 | St. Vrain | |
| 2001/0047334 A1 | 11/2001 | Nappe et al. | |
| 2001/0047489 A1 | 11/2001 | Ito et al. | |
| 2001/0051533 A1 | 12/2001 | Wietzke et al. | |
| 2002/0012445 A1 | 1/2002 | Perry | |
| 2002/0013728 A1 | 1/2002 | Wilkman | |
| 2002/0023055 A1 | 2/2002 | Antognini et al. | |
| 2002/0026394 A1 | 2/2002 | Savage et al. | |
| 2002/0038363 A1 | 3/2002 | MacLean | |
| 2002/0046169 A1 | 4/2002 | Keresman, III et al. | |
| 2002/0052842 A1 | 5/2002 | Schuba et al. | |
| 2002/0055907 A1 | 5/2002 | Pater et al. | |
| 2002/0069134 A1 | 6/2002 | Solomon | |
| 2002/0072976 A1 | 6/2002 | Virtanen et al. | |
| 2002/0077978 A1 | 6/2002 | O'Leary et al. | |
| 2002/0082985 A1 | 6/2002 | MacKay | |
| 2002/0087415 A1 | 7/2002 | Allen et al. | |
| 2002/0087468 A1 | 7/2002 | Ganesan et al. | |
| 2002/0087469 A1 | 7/2002 | Ganesan et al. | |
| 2002/0091635 A1 | 7/2002 | Dilip et al. | |
| 2002/0100803 A1 | 8/2002 | Sehr | |
| 2002/0107770 A1 | 8/2002 | Meyer et al. | |
| 2002/0107788 A1 | 8/2002 | Cunningham | |
| 2002/0111837 A1 | 8/2002 | Aupperle | |
| 2002/0128981 A1 | 9/2002 | Kawan et al. | |
| 2002/0138398 A1 | 9/2002 | Kalin et al. | |
| 2002/0169658 A1* | 11/2002 | Adler | 705/10 |
| 2002/0170966 A1 | 11/2002 | Hannigan et al. | |
| 2002/0178071 A1 | 11/2002 | Walker et al. | |
| 2002/0184151 A1 | 12/2002 | Maloney | |
| 2002/0194096 A1 | 12/2002 | Falcone et al. | |
| 2002/0198817 A1 | 12/2002 | Dhir | |
| 2002/0199182 A1 | 12/2002 | Whitehead | |
| 2003/0018557 A1 | 1/2003 | Gilbert et al. | |
| 2003/0037002 A1 | 2/2003 | Higgins et al. | |
| 2003/0040959 A1 | 2/2003 | Fei et al. | |
| 2003/0046218 A1 | 3/2003 | Albanese et al. | |
| 2003/0055675 A1 | 3/2003 | Klein Twennaar | |
| 2003/0069780 A1* | 4/2003 | Hailwood et al. | 705/10 |
| 2003/0097335 A1 | 5/2003 | Moskowitz et al. | |
| 2003/0105641 A1 | 6/2003 | Lewis | |
| 2003/0110442 A1 | 6/2003 | Battle | |
| 2003/0120686 A1 | 6/2003 | Kim et al. | |
| 2003/0130945 A1 | 7/2003 | Force et al. | |
| 2003/0130952 A1 | 7/2003 | Bell et al. | |
| 2003/0144942 A1 | 7/2003 | Sobek | |
| 2003/0187789 A1 | 10/2003 | Karas et al. | |
| 2003/0191710 A1 | 10/2003 | Green et al. | |
| 2003/0200107 A1 | 10/2003 | Allen et al. | |
| 2003/0208421 A1 | 11/2003 | Vicknair et al. | |
| 2003/0208441 A1 | 11/2003 | Poplawski et al. | |
| 2003/0225663 A1 | 12/2003 | Horan et al. | |
| 2003/0233305 A1 | 12/2003 | Solomon | |
| 2003/0237046 A1 | 12/2003 | Parker et al. | |
| 2004/0078328 A1 | 4/2004 | Talbert et al. | |
| 2004/0133516 A1 | 7/2004 | Buchanan et al. | |
| 2004/0201735 A1 | 10/2004 | Baron | |
| 2004/0228514 A1 | 11/2004 | Houle et al. | |
| 2004/0243539 A1* | 12/2004 | Skurtovich et al. | 707/1 |
| 2005/0033690 A1 | 2/2005 | Antognini et al. | |
| 2005/0055254 A1 | 3/2005 | Schmidtberg et al. | |
| 2005/0086178 A1* | 4/2005 | Xie et al. | 705/80 |
| 2005/0091156 A1* | 4/2005 | Hailwood et al. | 705/40 |
| 2005/0097050 A1 | 5/2005 | Orcutt | |
| 2005/0144059 A1 | 6/2005 | Schuessler | |
| 2005/0177480 A1 | 8/2005 | Huang | |
| 2005/0209954 A1 | 9/2005 | Asher et al. | |
| 2005/0261955 A1 | 11/2005 | Humble et al. | |
| 2006/0106650 A1 | 5/2006 | Bush | |
| 2006/0106717 A1 | 5/2006 | Randle et al. | |
| 2006/0136335 A1 | 6/2006 | Ferguson, III | |
| 2006/0178986 A1 | 8/2006 | Giordano et al. | |
| 2006/0206427 A1 | 9/2006 | Love et al. | |
| 2006/0282389 A1 | 12/2006 | Gupte | |
| 2006/0287953 A1* | 12/2006 | Chauhan | 705/39 |
| 2008/0193008 A1 | 8/2008 | Mount et al. | |

FOREIGN PATENT DOCUMENTS

| | | |
|---|---|---|
| EP | 1014318 | 6/2000 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Hunt, Robert M., An Introduction to the Economics of Payment Card Networks, Jun. 2003, 14 pages.

Armstrong, Douglas, Norwest eases difficulty of Interstate banking Bank's customers may use the same account number at any branch, Oct. 12, 1995, 3 pgs.

Maturi, Richard, Personal Finance; When you Need to Send Cash in a Flash, Sep. 25, 1988, 4 pgs.

Anonymous, Visa & Carnegie Mellon Plan Online Payment Scheme, Newsbyte News Network, Feb. 15, 1995.

Terrie Miller and Henry Yan, When Custody Governs, Benefits Canada, Toronto, Feb. 1998, vol. 22, Issue 2, p. 33, 5 pages.

Annual Report Pursuant to Sectin 13 or 15(d) of The Securities Exchange Act of 1934, Form 10-K, Intelidata Technologies Corporation, Fiscal Year Ended Dec. 31, 2001.

Blockbuster running test of a stored value card, The American Banker, Sep. 1, 1995.

CES/NaBANCO introduces stored value card technology blockbuster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol. 167, No. 154, Aug. 23, 2002.

Marjanovic, Corporate Services: Chase Gears Up Global Payments System Series: 16, The American Banker, vol. 160, issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card-Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554; Mar. 25, 2000, 2 pages.

(56) References Cited

OTHER PUBLICATIONS

Du Pont's Electronic Payments, Corporate EFT Report, v9, n1, Dialog file 636, Accession No. 01066902, Jan. 11, 1989.
Carreker, Electronic check presentment: Capturing new technology, http://proquest.umi.com, Banking Management, Rolling Meadows: vol. 71, Issue 2, Mar./Apr. 1995, p. 32, 5 pages.
Fidelity Helps Fund Sellers Trim the Taxes They'll Owe, The Wall Street Journal, Nov. 7, 2002.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money, Nov. 27, 2002.
Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Financial News, Wells Fargo Rolls Out Nationwide Lockbox Check Conversion, PR Newswire Association, Apr. 22, 2003.
NPL article titled: Kelly Services Implements Image-based Billing System for Customers' from PR Newswire, May 13, 1991: 1 page.
NPL article titled: "Electronic Data Interchange: a Challenge for Management Accountants" in CMA Accounting Magazine Aug. 1993; 6 pages.
NPL (Non-Patent Literature) showing detailed schedule of US PTO classification system for class 705; 4 pages.
NPL article titled: "Payments for Paperless Trade: Are the Viable Alternatives to the Documentary Credit?" by Emmanuel T. Laryea, in Law and Policy in International Business, Fall 2001, vol. 33, No. 1, pp. 3-49; 20 pages.
NPL article titled: "Overcoming the Float Time in Electronic Payment Use" by William Patterson in Network World, Aug. 28, 1989: 2 pages.
NPL article titled: "Not Yet a Sign of the Times" by Joseph McKendrick, in Credit Card Management, Apr. 1999: 5 pages.

\* cited by examiner

Request Header 132

| Request Identifier |
|---|
| Bank 110 |
| Bank 120 |
| Request Type |
| "Public" Request Data |
| Bank 110's Signature on Request Body |

Reply Header 142

| Reply Identifier |
|---|
| Bank 110 |
| Bank 120 |
| Reply Type |
| "Public" Reply Data |
| Bank 120's Signature on Reply Body |

Log Entry from Bank 110

| Request Header |
|---|
| Request Sent Time @ Bank 110 |
| Reply Header |
| Reply Receive Time @ Bank 110 |

Log Entry from Bank 120

| Request Header |
|---|
| Request Receive Time @ Bank 120 |
| Reply Header |
| Reply Sent Time @ Bank 120 |

Figure 2

METHOD AND SYSTEM FOR IMPLEMENTING EFFECTIVE GOVERNANCE OF TRANSACTIONS BETWEEN TRADING PARTNERS

CROSS-REFERENCE TO RELATED APPLICATIONS

This patent application is a continuation of U.S. patent application Ser. No. 11/551,966, entitled "Method and System For Implementing Effective Governance of Transactions Between Trading Partners," filed Oct. 23, 2006, and claims priority to U.S. Provisional Patent Application No. 60/732,155, filed Nov. 2, 2005, which are hereby incorporated by reference herein in their entirety.

FIELD OF THE INVENTION

The present invention relates generally to transactions between trading partners and, more particularly, to a method and system for implementing effective governance of transactions between trading partners in the financial industry through a third party matching entity.

BACKGROUND OF THE INVENTION

Trading partners are often associated with one another to perform certain types of business transactions or to use shared facilities, such as a communications network. The level of trust among partners may vary depending on the nature of the association, the value of the shared resources, and the value of the transactions carried out. One way of enhancing trust between the members is for an association to charter a third party with the responsibility for governing the use of the network, enforcing business practices, and performing reporting and accounting activities appropriate to the transactions.

In the past, such third parties, including credit card, debit card, and ACH network associations, have discharged their role by actively participating in the transmission of transactions between their members, typically by establishing communications "switches" that received, parsed, evaluated, logged, routed, and transmitted the messages within a secure location controlled by the third party. These "star" or "multi-star" networks, with their centralized switches, were compatible with the networking technology of the day, which relied upon leased lines and minicomputer or mainframe-based messaging hubs.

The Internet (and internet technologies used in private networks) is designed with an entirely different architecture. More specifically, Internet technologies rely on the routing of Internet Protocol packets among routers whose functions are deliberately minimized so as to allow high-speed processing and maximum efficiency in directly connecting network endpoints. There is no small set of centralized hubs through which all messages between the endpoints flow, and functionality is deliberately devolved from the "intelligent network" to the "intelligent periphery."

For Internet Protocol (IP) networks a new approach to governing the use of the network and the integrity of the transactions is needed.

One approach is for the third party to deploy its own devices at the periphery. There are several disadvantages of this approach, including the number of locations to be equipped, the difficulty of administering and maintaining dispersed devices, and the need to find suitable locations for sheltering, powering, cooling and securing the devices. If the devices are placed in the trading partners' data centers, then there are considerations as to whether the devices are outside a partner's firewalls, within the DMZ, or within the server farm. De-Militarized Zone refers to a network compartment separated from the external network by an external firewall and from the internal corporate networks and corporate server farms by an internal firewall. Devices located on a partner's premises may also be attacked and subverted by the partner, if there is an incentive to do so.

In view of the foregoing, it would be desirable to provide a method and system for implementing effective governance of transactions between trading partners in the financial industry through a third party log entry matching entity, which overcomes the above-described inadequacies and shortcomings.

SUMMARY OF THE INVENTION

According to an embodiment of the present invention, a method and a system provides for effective governance of transactions between trading partners in the financial industry through a third party log entry matching entity.

According to an exemplary embodiment of the present invention, a computer implemented method for governing business transactions between trading partners comprises the steps of: receiving a first independent log from a first trading partner wherein the first independent log comprises at least one request log entry associated with a transaction wherein the request log entry comprises at least a request identifier; receiving a second independent log from a second trading partner wherein the second independent log comprises at least one reply log entry associated with the transaction between the first trading partner and the second trading partner, wherein the reply log entry comprises at least a reply identifier; matching the at least one request log entry and the at least one reply log entry based on one or more of the request identifier and the reply identifier at a third party interface; identifying non-matching log entries at the third party interface; and forwarding the non-matching log entries for one or more of error processing and dispute resolution.

In accordance with other aspects of this exemplary embodiment of the present invention, the matching log entries are used to perform a business function as agreed to in a preexisting agreement between the first trading partner and the second trading partner; the business function comprises one or more of billing the first or second partner and transferring value between the partners; each of the request log entry and reply log entry contains at least part of a message plaintext exchanged between the first trading partner and the second trading partner; the message plaintext is encrypted and each of the request log entry and reply log entry contains cryptographic hash functions to allow later verification that the message plaintext logged by the first trading partner and the second trading partner was the actual message communicated in the transaction; the message plaintext is encrypted and each of the request log entry and reply log entry contains cryptographic digital signatures to allow later verification that the message plaintext logged by the first trading partner and the second trading partner was the actual message communicated in the transaction; the first independent log and the second independent log are sent by the first trading partner and the second trading partner, respectively, to the third party interface in real time, wherein each of the request log entry and reply log entry contains time stamps; each of the request log entry and reply log entry is cryptographically signed by each of the first trading partner and the second trading partner before the first independent log and the second independent log are sent to the third party interface; the third party interface matches each log entry in real time and notifies one or more of the first trading partner and the second trading partner that a mismatch has occurred; the third party interface matches each log entry in real time and notifies one or more of the first trading partner and the second trading partner that a match has occurred; each log entry contains data describing a value of a transaction; the value of the transaction comprises an amount of money transferred in the transaction between the first trading partner and the second trading partner; the third party interface uses the value of transactions with matching log data to provide financial settlement between or among the first trading partner and the second trading partner; the first trading partner and the second trading partner regard a transaction as settled when no notification of a mismatch is received from the third party interface or when notification of a match is received from the third party interface; the first trading partner and the second trading partner redo the transaction when one or more of the first trading partner and the second trading partner detects a failure; and the first trading partner and the second trading partner redo the transaction when one or more of the first or the second trading partner is notified of a log entry mismatch by the third party interface.

According to an exemplary embodiment of the present invention, a computer implemented system for governing business transactions between trading partners comprises a receiving module for receiving a first independent log from a first trading partner wherein the first independent log comprises at least one request log entry associated with a transaction wherein the request log entry comprises at least a request identifier and receiving a second independent log from a second trading partner wherein the second independent log comprises at least one reply log entry associated with the transaction between the first trading partner and the second trading partner, wherein the reply log entry comprises at least a reply identifier; and a matching module for matching the at least one request log entry and the at least one reply log entry based on one or more of the request identifier and the reply identifier at a third party interface; identifying non-matching log entries at the third party interface; and forwarding the non-matching log entries for one or more of error processing and dispute resolution.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 2 is an exemplary diagram of details of transactions, according to an embodiment of the present invention.

DETAILED DESCRIPTION OF EXEMPLARY EMBODIMENT(S)

An embodiment of the present invention generally relates to a method and system for implementing effective governance of transactions between trading partners in the financial industry through a third party matching entity. In many business situations, the trading partners are not motivated individually to subvert the integrity of the network, since it requires two colluding partners in order to use the network for purposes not authorized by the governing association. Therefore, effective governance can be established by having both participants report the essentials of a transaction to a third party.

Figure 1:
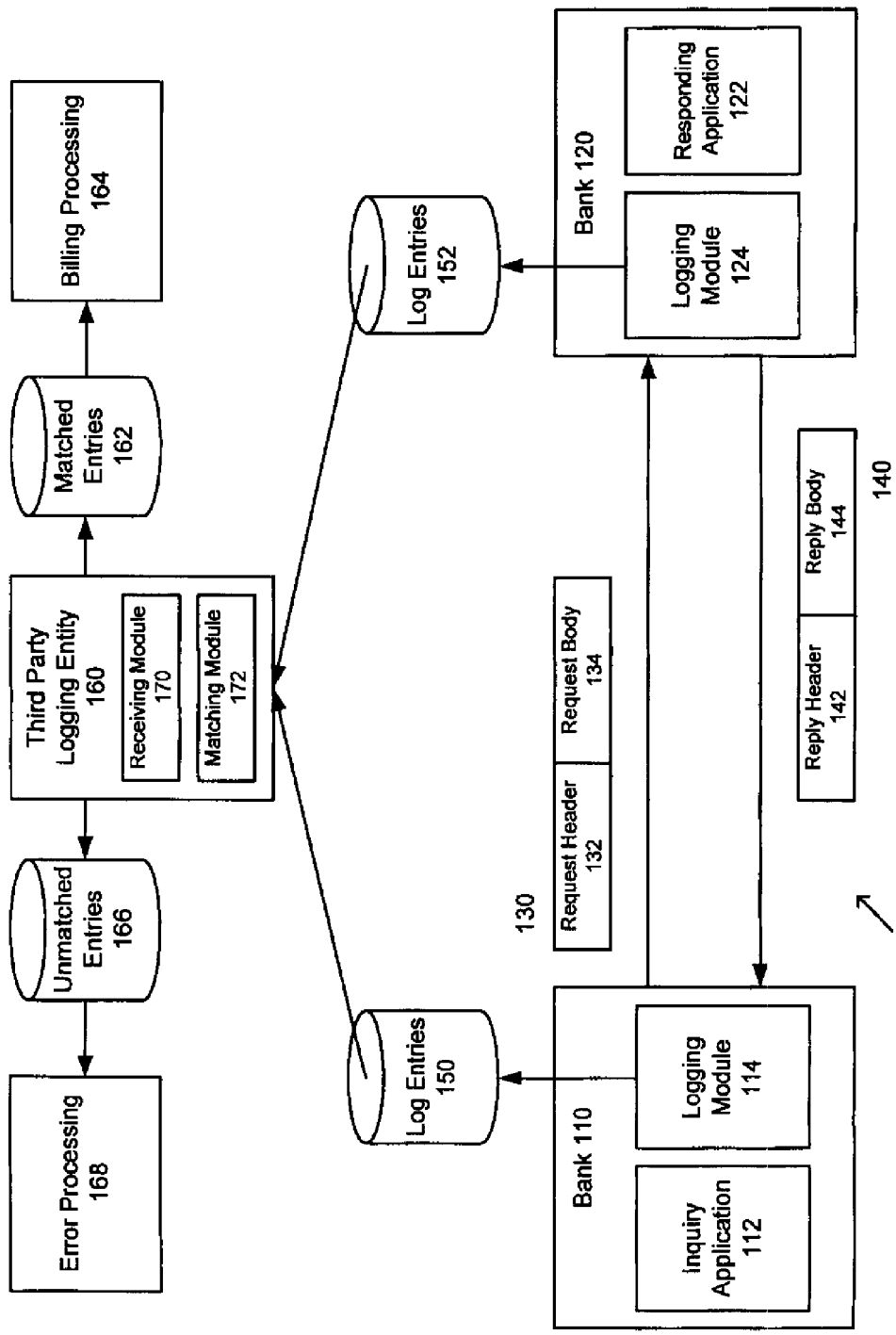
FIG. 1 is an exemplary diagram of a system for third party logging, according to an embodiment of the present invention.

FIG. 1 is an exemplary diagram of a system for third party logging, according to an embodiment of the present invention. In this exemplary system, trading partners may include financial institutions, such as banks represented by Bank 110 and Bank 120. Trading partners may include any entity who communicates and/or performs transactions with other entities. Trading partners are often associated with one another to perform certain types of business transactions or to use shared facilities, such as a communications network. The level of trust among partners may vary depending on the nature of the association, the value of the shared resources, and/or the value of the transactions carried out.

Bank 110 may include an inquiry application 112 and a logging module 114 in accordance with an embodiment of the present invention. In addition, Bank 120 may include a responding application 122 and a logging module 124. Similarly, if Bank 120 also functions as an inquiring entity, Bank 120 may include an inquiry application and if Bank 110 also functions as a responding entity, Bank 110 may include a responding application. The illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

While a single inquiry bank and a single responding bank are shown in FIG. 1, multiple trading partners may also be implemented as inquiry and/or responding entities. For example, multiple trading partners may include a supplier entity, a receiver entity and a manufacturer entity, where each trading partner supplies log entries to a Third Party Logging Entity. In addition, a requesting entity, a transporter entity and a receiving entity may be trading partners in system 100. According to another exemplary application, an inquiry bank, responding bank and an escrow entity may be trading partners in system 100. In this example, the escrow entity may release data, items, funds, etc. after a condition has been met to the satisfaction of one or more of the banks. Other types of entities may participate in system 100. In addition, other applications may be realized.

According to an embodiment of the present invention, Bank 110 may transmit an inquiry to Bank 120. The inquiry may be transmitted via various modes of communication, such as electronic (e.g., email, instant messages, Internet, Intranet, etc.), voice (e.g., wireless, phone, etc.), mobile devices (e.g., PDA, etc.) and/or other methods of communicating digital information. For example, Bank 110 may forward a Request 130 to Bank 120. The Request 130 may include a Request Header 132 and Request Body 134. In response, Bank 120 may forward a Response 140 to Bank 110. Response 140 may include a Reply Header 142 and Reply Body 144.

The inquiry may concern account and/or other information. For example, Bank 110 may receive a check or other payment instrument drawn on Bank 120. To verify the existence of the account, Bank 110 may inquire whether a particular account number is open and/or valid. Bank 120 may reply to the inquiry. The response may include confirmation that the account number is open or closed. The response may include a simple yes or no response or other response indicating the same. If desired, additional information concerning an invalid account may be relayed, such as when the account was closed, under what circumstances, and whether fraud was involved thereby alerting the inquiry entity of a possible fraud situation.

In addition, Bank 110 may inquire whether an account has available funds for withdrawal or other action prior to or shortly thereafter payment of the same. In this example, the responding bank may indicate availability of funds. In addition, further details concerning the amount or level of funds available may be provided. Further, Bank 110 may inquire about a customer's credit history or other related information. According to another embodiment, the trading partners may be different types of entities. For example, a mortgage company may transmit an inquiry to a financial institution concerning a particular customer. A requesting entity may request confirmation that certain accounts exist and/or that information provided by the customer is accurate. In addition, the requesting entity may request data concerning fraudulent and/or potentially fraudulent activities.

For example, a requesting entity may request that money be moved between an account at Bank 110 and an account at Bank 120. For example, the request may contain the Federal Reserve Routing and Transit Number, account number, check number, amount, and/or other data for one or more checks along with corresponding check images. The reply may contain an indication of whether the check(s) had been received for clearing and settlement in good order or not. Other non-check payment instructions may also be included corresponding to various payment types and/or payment services. However, the method is not limited to value bearing or non-value bearing transactions between financial institutions, but may also include purchasing transactions between commercial partners, transfer of records between medical organizations, and/or other transfer of useful information.

Participating trading partners may enter into agreements between or among themselves. In addition, the trading partners may enter into an agreement with a third party, individually or collectively. For example, Bank 110 and Bank 120 may have an existing agreement. In this example, a business agreement among the partners may indicate that Bank 110 will pay the third party for carrying the messages over an IP network service or other network, and Bank 110 will pay Bank 120 for the information about the account, provided that the response was received promptly. Other conditions and arrangements may be agreed upon.

For privacy and security, the Request Body 134 of the Request 130 and the Reply Body 144 of the Reply 140 may be encrypted between the Inquiry Application 112 of Bank 110 and a Responding Application 122 of Bank 120. The headers on the messages (e.g., Request Header 132 and Reply Header 142) may include an identifier for correlating the request with the reply. In addition, the header may also include the identities of the banks, the request type, possibly "public" data which is not sensitive and which may be recapitulated from the body, the bank's digital cryptographic signature on the body and/or other data. More specifically, the sending bank may first create a digital cryptographic signature on the message body, which the receiving bank may use to authenticate the identify of the sending bank. In addition, the receiving bank may verify that the message has not been modified in transit, and/or assure itself that the sending bank cannot repudiate the message contents to the extent agreed a priori. Other functions may be performed. Since the body of the message, including the signature may be encrypted to ensure privacy and confidentiality of the content, a copy of the digital cryptographic signature may be copied into the header so that the third party log may contain the time of transmission, the signature and/or other data. Further, the third party may provide a digital notary service without being privy to the message content. Other encryption and/or other security measures may be implemented.

For example, Bank 110 may sign the request body using Bank 110's private key (or other secure signature). Bank 120 may verify Bank 110's signature on the request body using Bank 110's public key. Similarly, Bank 120 may sign the reply body using Bank 120's private key (or other secure signature). Bank 110 may verify Bank 120's signature on the request body using Bank 120's public key. During the logging process, both Banks may privately log the plaintext request body and the reply body, as well as the signatures on each, so that each Bank may obtain a complete record of the business transaction.

As Bank 110 executes transactions with Bank 120 and with other trading partners, Bank 110 may log each entry where each entry may include a request header, a send time, a reply header and a receive time, through Logging Module 114. Other data may be included in each log entry. Bank 120 may perform similar logging operations through Logging Module 124. Immediately or at predetermined intervals, each trading partner may forward a log of log entries to Third Party Logging Entity 160.

Third Party Logging Entity 160 may include various modules for performing matching and other functionality in accordance with the various embodiments of the present invention. For example, Third Party Logging Entity 160 may include a Receiving Module 170 for receiving the respective logs (as shown by Log Entries 150 and Log Entries 152) from Bank 110 and Bank 120. Third Party Logging Entity 160 may include Matching Module 172 for matching log entries from the respective logs 150, 152 forwarded by requesting and responding banks, e.g., Bank 110 and Bank 120. Third Party Logging Entity 160 may identify the matching log entries in a database 162 or other storage mechanism. Third Party Logging Entity 160 may represent a service provider or other independent entity.

As shown by 164, matching entries may be used to bill or pay one or more trading partners for the agreed upon fees or to create settlement entries in the case of value-bearing transactions. For example, if the third party provides the data communications network, it may bill the requesting or responding Bank to recover the costs of data communications. In another example, the Third Party may bill the requesting Bank and pay the responding Bank an amount to compensate the responding Bank for the value of its information. Other header information, such as the type of transaction or the time between request and response may be used. In some cases, the responding Bank may not be paid if it does not respond within a Service Level Agreement defined interval. Finally, if the transaction clears a check or checks, and the aggregate value thereof is contained in the header, the Third Party may debit the responding Bank's settlement account and credit the requesting Bank's settlement account to transfer the funds between the Banks. Other business arrangements related to governance of transactions, the collection of fees or the transfer of value may be implemented as desired by the Banks. If a dispute arises, it may be agreed to forward the dispute to an agreed upon fourth party dispute resolver, as detailed below in connection with FIG. 4 discussed below.

Third Party may identify unmatched entries at 166. The unmatched entries may be forwarded for error processing, as shown by 168. For example, unmatched entries may be due to failures of the software components, servers, and communications lines and devices between the trading partners. However, with modern transactional protocols between the partners, the layers of error detection and recovery in IP network protocol stacks, and the protection of encryption and digital signatures, a mismatch due to technical factors will be very rare. This is in contrast to former networks which employed analog modems to connect partners to switches using elementary protocols.

When unmatched entries are identified, the third party may notify one or more of the trading partners and take an appropriate action. For example, one action may be to suspend billing for services until the discrepancy is resolved. This may involve determining whether a technical problem has occurred or whether one of the partners is at fault. Another action may involve suspending the settlement of a value-bearing transaction. Another exemplary action may include reducing the amount settled if the reply header contains a lesser amount than the request header, due to the responding Bank's not accepting one or more checks contained in the request. Any systematic attempt by any single trading partner to deny that transactions have occurred will be revealed by a pattern of unmatched log entries from other trading partners. The logs collected by the third party may also be used to resolve disputes regarding the content of the transactions themselves.

FIG. 2 is an exemplary diagram of details of transactions, according to an embodiment of the present invention. In connection with FIG. 1, FIG. 2 provides details concerning the transactions between trading partners and the third party. As discussed above, Request 130 may include Request Header 132 and Request Body 134. Request Header 132 may include Request Identifier, Bank 110, Bank 120, Request Type, "Public" Request Data and Bank 110's signature on the Request Body. Examples of "Request Type" may include "clear a check(s)," "verify that an account is open and able to be debited," "verify that an identified individual has authority over an account," etc. Examples of "Public Request Data" may include the value of the check(s) being cleared, the Federal Reserve Routing and Transit Number of an account, or the type of identifier (e.g., tax ID, driver's license, passport number, etc.) being used. Reply 140 may include Reply Header 142 and Reply Body 144. Reply Header 142 may include Reply Identifier, Bank 110, Bank 120, Reply Type, "Public" Reply Data and Bank 120's signature on the Reply Body.

As discussed above, Bank 110 may forward a log of log entries to the third party. Each log entry may include Request Header, Request Send Time at Bank 110, Reply Header and Reply Receive Time at Bank 110. In addition, Bank 120 may forward log entries to third party. This transaction may include Request Header, Request Receive Time at Bank 120, Reply Header and Reply Send Time at Bank 120.

Figure 3:
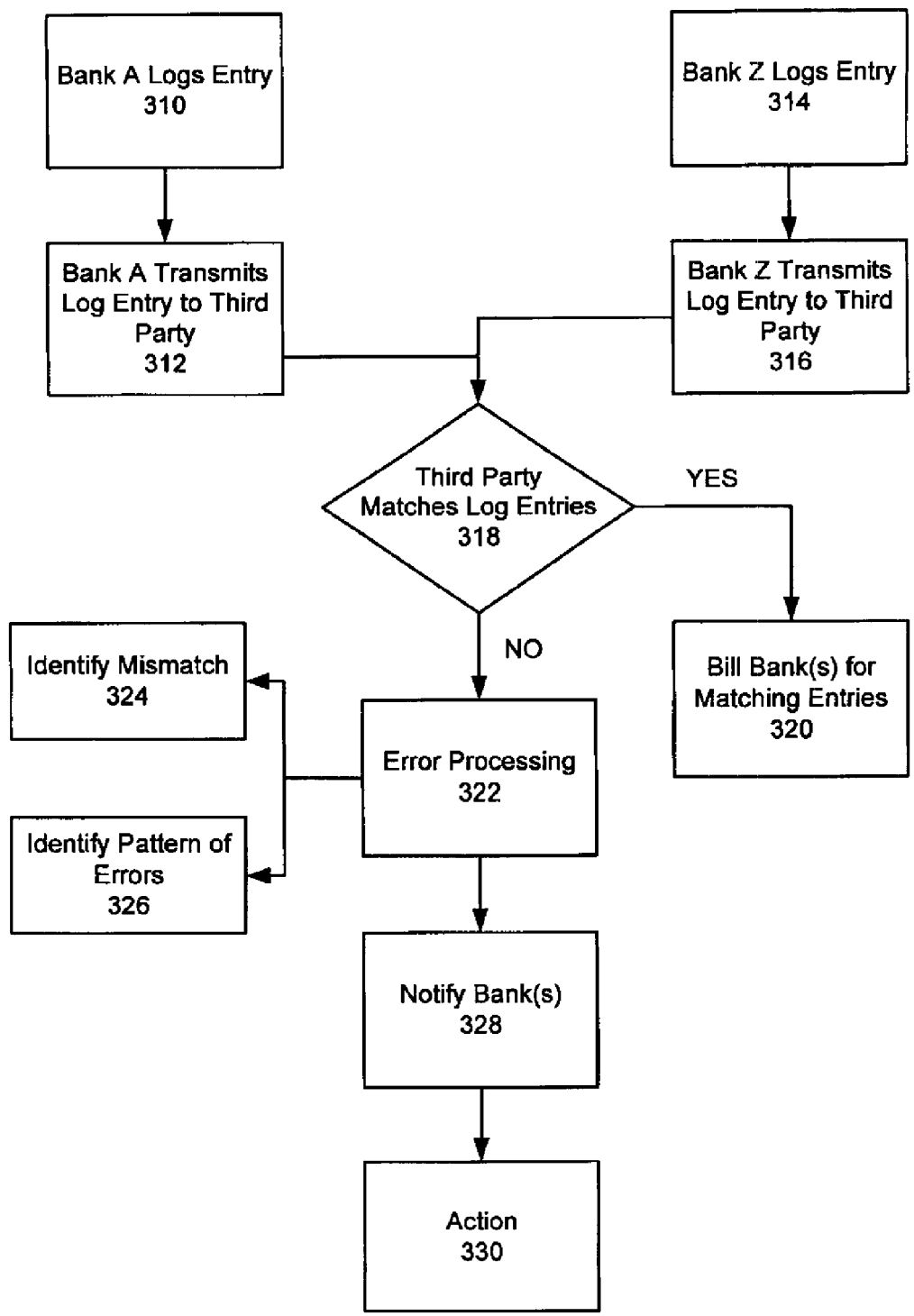
FIG. 3 is an exemplary flowchart illustrating a method for third party logging, according to an embodiment of the present invention.

FIG. 3 is an exemplary flowchart illustrating a method for third party logging, according to an embodiment of the present invention. At step 310, Bank A may log an entry. At step 312, Bank A may transmit a log entry or file of log entries to a Third Party. At step 314, Bank Z may log an entry. At step 316, Bank Z may transmit a log entry or file of log entries to a Third Party. At step 318, the Third Party may match the respective log entries from trading partners, e.g. Bank A and Bank Z. If a match is determined, a billing process, or other business processes depending on message types, business agreements and/or other considerations may be implemented at step 320. If a match is not determined, the data may be forwarded for error processing, as shown by step 322. For example, error processing may involve identifying a mismatch, at step 324 and/or identifying a pattern of errors, at step 326. Based on the results of the error processing, one or both Banks may be notified, at step 328. The Bank may then take appropriate action, at step 330. The steps of FIG. 3 will be described in detail below.

At step 310, Bank A may log an entry. The log entry may include a request, reply header and respective time data. The log entries from each trading partner may contain part or all of a message plaintext exchanged between the trading partners. The message plaintext may be encrypted and the log entries may contain cryptographic hash functions to allow later verification that a plaintext message logged by a trading partner was the actual message communicated. In addition, the log entries may contain cryptographic digital signatures or other signature mechanism for subsequent verification.

At step 312, at a predetermined time or other interval, Bank A may transmit a log entry or a file of log entries to a Third Party. The logs may be sent by each respective trading partner to the third party in real time, wherein each log entry may contain time stamps or other indication. Each log entry of each log may be cryptographically signed by the trading partners before the logs are sent to the third party.

At step 314, Bank Z may log an entry. The log entry may include a request, reply header and respective time data. The log entries from each trading partner may contain part or all of a message plaintext exchanged between the trading partners. The message plaintext may be encrypted and the log entries may contain cryptographic hash functions to allow later verification that a plaintext message logged by a trading partner was the actual message communicated. In addition, the log entries may contain cryptographic digital signatures or other signature mechanism for subsequent verification.

In addition, each log entry (at either or both trading partner) may contain data describing characteristics of a transaction. For example, the log entry may contain the value of the transaction, e.g., an amount of money transferred between the trading partners. Other data may be included.

At step 316, at a predetermined time or other interval, Bank Z may transmit a log entry or file of log entries to a Third Party. The logs may be sent by each respective trading partner to the third party in real time, wherein each log entry may contain time stamps or other indication. Each log entry of each log may be cryptographically signed by the trading partners before the logs are sent to the third party.

At step 318, the Third Party may match the respective log entries from trading partners, e.g. Bank A and Bank Z. For example, the third party may match the log entries by an identifier, such as a request identifier and a reply identifier. One method of matching may involve Bank A uniquely identifying each request with successive values from a counter, and for Bank B to reuse the request serial number as the reply identifier serial number. In this case, the matching may be achieved by sorting and aligning the corresponding log entries from the two banks. In addition, the two Banks may independently generate globally unique identifiers for the request identifier and reply identifier using the mechanisms available in operating systems and include both the request and reply identifiers in each log entry. In this case, the Third Party may choose to sort on the request or reply identifier, align the log entries accordingly, and in the case of mismatches attempt to sort and align log entries on the other identifier before declaring a mismatch. The third party may match each log entry in real time and notify either or both trading partners that a mismatch or a match has occurred within a predetermined time interval.

If a match is determined, the billing process may be implemented at step 320. For example, each bank may be billed for matching entries, per an agreement. The trading partners may regard a transaction as final based on an event. For example, if a notification of a mismatch is not received from the third party or if notification of a match is received from a third party, the transaction may be considered settled. As discussed above, log entries may contain data describing characteristics of a transaction. For example, the log entry may contain the value of the transaction, e.g., an amount of money transferred between the trading partners. According to an embodiment of the present invention, the third party may use the value of transactions with matching log data to provide financial settlement between or among the partners.

If a match is not determined, the data may be forwarded for error processing, as shown by step 322. The trading partners may redo any transaction based on certain circumstances, such as if the trading partners independently detect a failure with by their own analysis of cryptographic hashes and/or the completion of transactional protocols.

For example, error processing may involve identify a mismatch, at step 326 and/or identify a pattern of errors, at step 326. Based on the results of the error processing, one or both Banks may be notified, at step 328. For example, the trading partners may be notified of a log entry mismatch by the third party. The Bank may then take appropriate action, at step 330. According to an embodiment of the present invention, trading partners may update their records prior to any feedback from the third party. Either they get no message from the third party or they receive an indication that there was no match, in which case the course of action to redo or rollback the transaction is dependent on the business practices between the trading partners.

Figure 4:
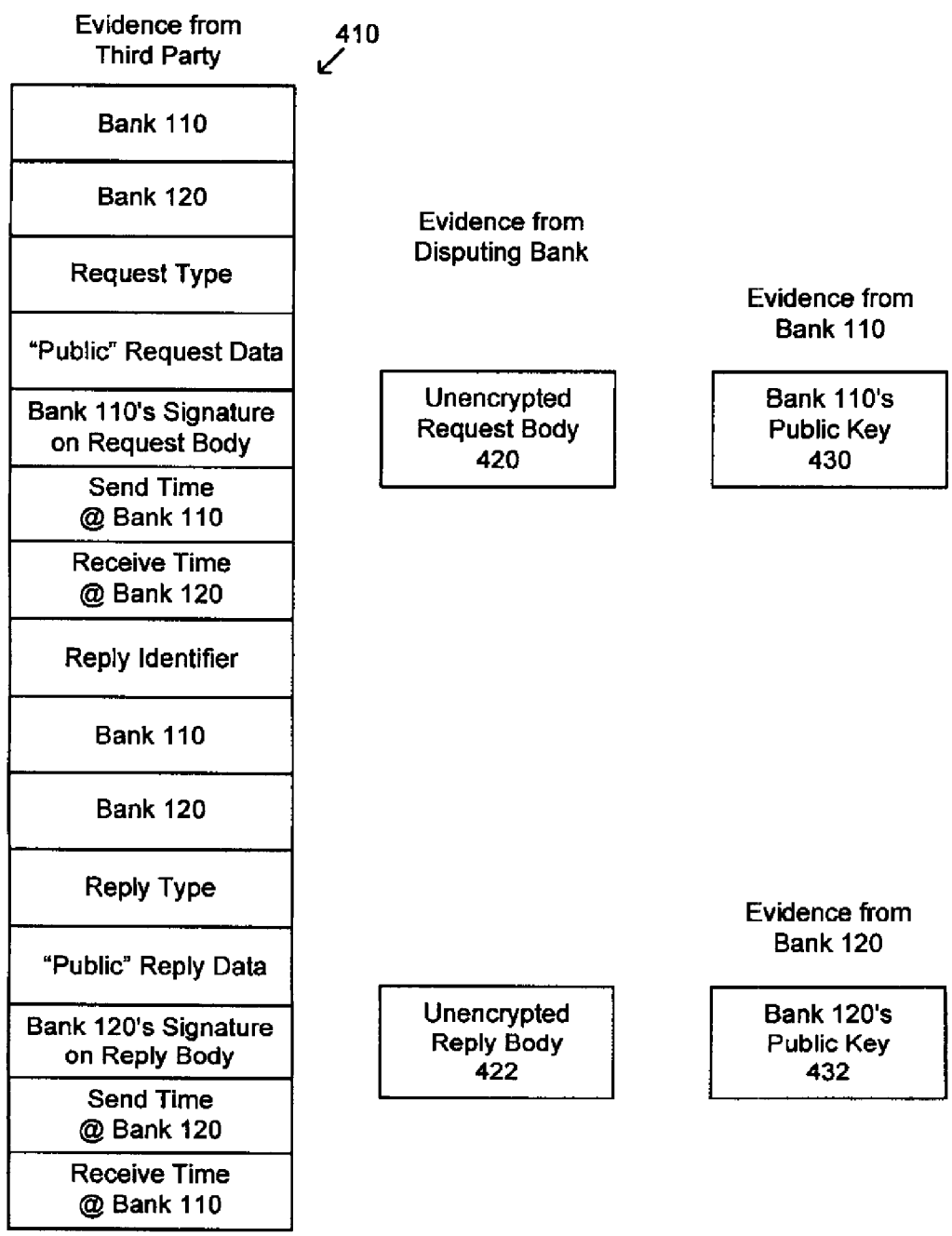
FIG. 4 is an exemplary flowchart illustrating a method for third party dispute resolution, according to an embodiment of the present invention.

FIG. 4 is an exemplary flowchart illustrating a method for third party dispute resolution, according to an embodiment of the present invention. As shown in FIG. 4, the third party may provide a combined log, as shown by 410. The combined log may include log information from both trading partners. In this example, the combined log may include the Request Header with sent time and receive time data combined with the Reply Header with sentme and receive time data. The combined log entry of 410 may also have been dated, time stamped, and/or countersigned cryptographically by the Third Party at the time when the log entries were matched, which is useful when the dispute resolution is decided and enforced by a Fourth Party, such as in providing evidence to a court. Each trading partner may submit data concerning a disputed transaction. For example, evidence from a disputing entity may include the unencrypted request body 420 and unencrypted reply body 422 as recorded in and extracted from the disputing party's private transaction logs. In addition, the request identifier, the public request data and public reply data may be contained in the appropriate Request Body and Reply Body. Thus, the plaintext of the request and reply may be forwarded to a fourth party "resolver" to resolve the dispute.

The resolver can verify the public key signatures as logged by the third party on both the request and response plaintext. For example, the resolver may verify Bank 110's signature to prove that the unencrypted body is a true or accurate copy of the Request that was logged. Evidence from Bank 110 may include Bank 110's public key data, as illustrated by 430. In addition, the resolver may verify Bank 120's signature to prove that the unencrypted body is a true or accurate copy of the reply that was logged. Evidence from Bank 120 may include Bank 120's public key data, as illustrated by 432. According to an embodiment of the present invention, the third party is trusted to deliver a true or accurate copy of the logged data. For example, the third party may sign the log data using the third party private key and then return the logs to each trading partner for signature verification and individual safekeeping. Accordingly, the third party does not need to retain any data.

The fact that the signatures are provided by the third party prevents either trading partner from modifying the plaintext and computing a new digital signature and it prevents either trading partner from denying that the transaction occurred at or near the time the log data was collected. According to an exemplary application, the time that a transmission occurred may be prior to the time that the log entry was received by the Third Party. Successive log entries in a continuous stream of transactions may also be used to demonstrate that the transaction occurred after the time of the log entry for a previous transaction received by the Third Party. Furthermore, the time stamps applied to a stream of headers may be used by the Third Party to detect a systematic error or bias in the clocks of Banks 110 and 120. In particular, the two times provided by Bank 120 may be logically between the two time stamps provided by Bank 110. That fact, along with the Third Party's collection of network transit times generally, may be used to estimate the relative inaccuracy of the two Bank's clocks.

According to an embodiment of the invention, the systems and processes described above invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the embodiments of the present inventions may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the embodiments of the present inventions may comprise computer readable program code in the form of functional instructions stored in the computer-usable medium such that when the computer-usable medium is installed on the system or systems, those components cause the system to perform the functions described. The computer readable program code for the embodiments of the present inventions may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. An automated computer implemented method for governing business transactions between trading partners, where the method is executed by a programmed computer processor which communicates with a user via a network, the computer implemented method comprising the steps of:
   receiving, via a network, a first independent log from a first trading partner where the first independent log comprises at least one request log entry associated with a transaction where the at least one request log entry comprises at least a request identifier;
   receiving, via a network, a second independent log from a second trading partner where the second independent log comprises at least one reply log entry associated with the transaction between the first trading partner and the second trading partner, where the at least one reply log entry comprises at least a reply identifier;
   matching, using at least one programmed computer processor, the at least one request log entry and the at least one reply log entry based on one or more of the request identifier and the reply identifier at a third party interface;
   identifying, using at least one programmed computer processor, non-matching log entries at the third party interface; and
   forwarding, via a network, the non-matching log entries to take an appropriate action.

2. The method of claim 1, further comprising the step of:
   identifying matching log entries at the third party interface for implementing a billing process for the matching log entries;
   wherein the matching log entries are used to perform a business function as agreed to in a preexisting agreement between the first trading partner and the second trading partner.

3. The method of claim 2, wherein the business function comprises one or more of billing the first trading partner or the second trading partner and transferring value between the partners.

4. The method of claim 1, wherein each of the at least one request log entry and the at least one reply log entry contains at least part of a message plaintext exchanged between the first trading partner and the second trading partner.

5. The method of claim 4, wherein the at least part of the message plaintext is encrypted and each of the at least one request log entry and the at least one reply log entry contains cryptographic hash functions to allow later verification that the message plaintext logged by the first trading partner and the second trading partner was an actual message communicated in the transaction.

6. The method of claim 4, wherein the at least part of the message plaintext is encrypted and each of the at least one request log entry and the at least one reply log entry contains cryptographic digital signatures to allow later verification that the message plaintext logged by the first trading partner and the second trading partner was an actual message communicated in the transaction.

7. The method of claim 2, wherein the first independent log and the second independent log are sent by the first trading partner and the second trading partner, respectively, to the third party interface in real time, wherein each of the at least one request log entry and the at least one reply log entry contains time stamps.

8. The method of claim 2, wherein each of the at least one request log entry and the at least one reply log entry is cryptographically signed by each of the first trading partner and the second trading partner before the first independent log and the second independent log are sent to the third party interface.

9. The method of claim 1, wherein the third party interface matches each log entry in real time and notifies one or more of the first trading partner and the second trading partner that a mismatch has occurred.

10. The method of claim 1, wherein the third party interface matches each log entry in real time and notifies one or more of the first trading partner and the second trading partner that a match has occurred.

11. The method of claim 1, wherein each log entry contains data describing a value of a transaction.

12. The method of claim 11, wherein the value of the transaction comprises an amount of money transferred in the transaction between the first trading partner and the second trading partner.

13. The method of claim 11, wherein the third party interface uses the value of the transaction with matching log data to provide financial settlement between or among the first trading partner and the second trading partner.

14. The method of claim 1, wherein the first trading partner and the second trading partner regard a transaction as settled when no notification of a mismatch is received from the third party interface or when notification of a match is received from the third party interface.

15. The method of claim 1, wherein the first trading partner and the second trading partner redo the transaction when one or more of the first trading partner and the second trading partner detects a failure.

16. The method of claim 1, wherein the first trading partner and the second trading partner redo the transaction when one or more of the first trading partner or the second trading partner is notified of a log entry mismatch by the third party interface.

17. A computer implemented system for governing business transactions between trading partners, the computer implemented system comprising:
   a receiving module, comprising at least one computer processor, configured to receive a first independent log from a first trading partner where the first independent log comprises at least one request log entry associated with a transaction where the at least one request log entry comprises at least a request identifier and receive a second independent log from a second trading partner where the second independent log comprises at least one reply log entry associated with the transaction between the first trading partner and the second trading partner, where the at least one reply log entry comprises at least a reply identifier; and a matching module, comprising at least one computer processor, configured to match the at least one request log entry and the at least one reply log entry based on one or more of the request identifier and the reply identifier at a third party interface; identify non-matching log entries at the third party interface; and forward the non-matching log entries to take an appropriate action.

18. The system of claim 17, the matching module is further configured to identify matching log entries at the third party interface for implementing a billing process for the matching log entries; wherein the matching log entries are used to perform a business function as agreed to in a preexisting agreement between the first trading partner and the second trading partner.

19. The system of claim 18, wherein the business function comprises one or more of billing the first trading partner or the second trading partner and transferring value between the partners.

20. The system of claim 17, wherein each of the at least one request log entry and the at least one reply log entry contains at least part of a message plaintext exchanged between the first trading partner and the second trading partner.

21. The system of claim 20, wherein the at least part of the message plaintext is encrypted and each of the at least one request log entry and the at least one reply log entry contains cryptographic hash functions to allow later verification that the message plaintext logged by the first trading partner and the second trading partner was an actual message communicated in the transaction.

22. The system of claim 20, wherein the at least part of the message plaintext is encrypted and each of the at least one request log entry and the at least one reply log entry contains cryptographic digital signatures to allow later verification that the message plaintext logged by the first trading partner and the second trading partner was an actual message communicated in the transaction.

23. The system of claim 17, wherein the first independent log and the second independent log are sent by the first trading partner and the second trading partner, respectively, to the third party interface in real time, wherein each of the at least one request log entry and the at least one reply log entry contains time stamps.

24. The system of claim 17, wherein each of the at least one request log entry and the at least one reply log entry is cryptographically signed by each of the first trading partner and the second trading partner before the first independent log and the second independent log are sent to the third party interface.

25. The system of claim 17, wherein the third party interface matches each log entry in real time and notifies one or more of the first trading partner and the second trading partner that a mismatch has occurred.

26. The system of claim 17, wherein the third party interface matches each log entry in real time and notifies one or more of the first trading partner and the second trading partner that a match has occurred.

27. The system of claim 17, wherein each log entry contains data describing a value of a transaction.

28. The system of claim 27, wherein the value of the transaction comprises an amount of money transferred in the transaction between the first trading partner and the second trading partner.

29. The system of claim 27, wherein the third party interface uses the value of the transaction with matching log data to provide financial settlement between or among the first trading partner and the second trading partner.

30. The system of claim 17, wherein the first trading partner and the second trading partner regard a transaction as settled when no notification of a mismatch is received from the third party interface or when notification of a match is received from the third party interface.

31. The system of claim 17, wherein the first trading partner and the second trading partner redo the transaction when one or more of the first trading partner and the second trading partner detects a failure.

32. The system of claim 17, wherein the first trading partner and the second trading partner redo the transaction when one or more of the first trading partner or the second trading partner is notified of a log entry mismatch by the third party interface.

* * * * *